United States Patent [19]

Cutler et al.

[11] Patent Number: 5,148,544

[45] Date of Patent: Sep. 15, 1992

[54] APPARATUS AND METHOD FOR CONTROL OF ASYNCHRONOUS PROGRAM INTERRUPT EVENTS IN A DATA PROCESSING SYSTEM

[75] Inventors: David N. Cutler, Bellevue; David A. Orbits, Redmond, both of Wash.; Dileep Bhandarkar, Shrewsbury, Mass.; Wayne Cardoza, Merrimack, N.H.; Richard T. Witek, Littleton, Mass.

[73] Assignee: Digital Equipment Corporation, Maynard, Mass.

[21] Appl. No.: 704,710

[22] Filed: May 17, 1991

Related U.S. Application Data

[63] Continuation of Ser. No. 69,436, Jul. 1, 1987, abandoned.

[51] Int. Cl.⁵ .................. G06F 9/46; G06F 9/00
[52] U.S. Cl. ................... 395/725; 395/775; 364/DIG. 1; 364/232.9; 364/280.9; 364/280.8; 364/263.2; 364/242.1; 364/241.2; 364/230.2
[58] Field of Search ............. 395/725, 775; 364/DIG. 1

[56] References Cited

U.S. PATENT DOCUMENTS

| | | |
|---|---|---|
| 3,560,935 | 2/1971 | Beers. |
| 3,905,023 | 9/1975 | Perpiglia .................. 340/172.5 |
| 4,050,060 | 9/1977 | Birney et al. ............. 364/200 |
| 4,193,113 | 3/1980 | Cykowski ................. 364/200 |
| 4,215,399 | 7/1980 | Pavicic et al. ............ 364/101 |
| 4,271,468 | 6/1981 | Christensen et al. ...... 364/200 |
| 4,275,458 | 6/1981 | Khera ....................... 364/900 |
| 4,320,451 | 3/1982 | Bachman et al. ......... 364/200 |
| 4,339,808 | 7/1982 | North ........................ 364/900 |
| 4,426,679 | 1/1984 | Yu et al. ................... 364/200 |
| 4,438,492 | 3/1984 | Harmon, Jr. et al. ..... 364/200 |
| 4,485,440 | 11/1984 | Duff et al. ................ 364/300 |
| 4,584,639 | 4/1986 | Hardy ....................... 364/200 |

OTHER PUBLICATIONS

*Technical Summary: VAX*, Digital Equipment Corporation, 1982, Chapter 4, pp. 22-24.
R. J. Gallagher; Hardware Interrupt Structure for a Distributed Processing System; Dec. 1979; 8167 Computer Design vol. 18; pp. 15-19.

Primary Examiner—Eddie P. Chan
Attorney, Agent, or Firm—Fish & Richardson

[57] ABSTRACT

In a data procesing system having a kernel mode (i.e., for executing privileged instructions) and a user mode of operation, apparatus for responding to interrupt conditions includes a first register, subject to the control of the currently executing program for enabling the generation of a mode-related interrupt signal and includes a second register for indicating the presence of a pending mode-related interrupt condition and a third register for requesting a mode-related interrupt be entered in the second register. The mode of operation and the enable and pending interrupt condition registers are monitored and when the signals in the two registers have the appropriate relationship, an interrupt signal is generated to which a control program will respond. The contents of the first register can be controlled by the currently executing program which can control the enabling signal for the currently executing mode. The pending interrupt condition and the request registers may be accessed only from the privileged mode of operation.

22 Claims, 6 Drawing Sheets

APPARATUS AND METHOD FOR CONTROL OF ASYNCHRONOUS PROGRAM INTERRUPT EVENTS IN A DATA PROCESSING SYSTEM

This is a continuation of application Ser. No. 069,436, filed on Jul. 1, 1987, now abandoned.

RELATED APPLICATIONS

This application is related to the following Patent Applications.

APPARATUS AND METHOD FOR PROVIDING AN EXTENDED PROCESSING ENVIRONMENT FOR NONMICROCODED DATA PROCESSING SYSTEMS invented by David N. Cutler, David A. Orbits, Dileep Bhandarkar, Wayne Cardoza and Richard T. Witek; having Ser. No. 07/069,365; filed on Jul. 1, 1987, now abandoned and assigned to the assignee of the present U.S. patent application.

APPARATUS AND METHOD FOR MAIN MEMORY UNIT PROTECTION USING ACCESS AND FAULT LOGIC SIGNALS invented by David N. Cutler, David A. Orbits, Dileep Bhandarkar, Wayne Cardoza and Richard T. Witek; having Ser. No. 07/069,290; filed on Jul. 1, 1987, now abandoned and assigned to the assignee of the present U.S. patent application.

BACKGROUND OF THE INVENTION

1. Field of the Invention

This invention relates generally to data processing systems and, more particularly, to events that can cause a change in the program under execution in a data processing system.

2. Description of the Related Art

In modern high performance data processing systems, the processing capability is sufficient to permit a multiplicity of activities to be carried on concurrently. Without the concurrency of activities, the resources of the data processing system would be under-utilized. A control program is typically required to schedule the resources of the data processing system and provide program execution among a set of system users. The control program is provided with the capability of suspending the execution of a program by saving the state of parameters of a resource (such as a data processing unit), permitting another program to utilize the resource and then restoring the resource states or parameters, and continuing execution of the suspended program. In this manner, resources can be multiplexed with respect to a plurality of system users and/or programs. The control program is responsible for maintaining the activity of the data processing system at as high a level as possible consistent with an equitable allocation of the system resources among the potential candidates for use of the resources.

While an activity is being executed in response to the current program, the interruption of the executing activity can be necessary to respond to events that occur outside the cognizance of the control program. The currently executing program must therefore be notified that an external activity has a requirement for the resource. Exemplary of external events requiring a resource in current use can be completion of an input/output (I/O) request, an interruption generated by another program (e.g., a program signal), a terminal user interrupting the program by means of a keyboard of other device for entering a signal by a system user or by the control program itself to notify the program of asynchronous events (e.g., an expired timer). These events are typically referred to as AST (Asynchronous System Trap) events. Indeed, the control program can have a need to interrupt an executing program to execute part of the control program itself in the context of the appropriate program (e.g., posting I/O completion of transfer data groups from internal buffers to program buffers, etc.). However, the interruption of a program at a given time can be inappropriate and lead to the compromise of critical data.

In the related data processing systems, the capabilities required for program interruption have been implemented in the control program itself. The control program implementation of program interruption require high overhead costs in the form of processing capability utilization and, in addition, require that certain events must be continually monitored. Each time a monitored event is detected, the control program must test related conditions to determine if the currently executing program is to be interrupted to execute the interruption program. Moreover, the currently executing program must be able to inform the control program that it cannot be interrupted at the present time. Finally, if the program interrupts or attempts to interrupt are frequent, then an unacceptable amount of the processing capability can used in the control program.

A need has therefore been felt for apparatus and method to control program interrupts that is directly available to nonprivileged programs and which do not contain the inefficiencies involved in a software program implementation.

FEATURES OF THE INVENTION

It is an object of the present invention to provide an improved data processing unit.

It is a feature of the present invention to provide a data processing system having improved control of the interruption of the currently executing program.

It is another feature of the present invention to provide a mechanism for indicating when an interrupt condition is enabled in a particular mode and when an interrupt condition is present in a particular mode.

It is still another feature of the present invention to monitor the interrupt enabled mechanism and the interrupt present mechanism and when the conditions coincide, to generate an interrupt signal.

It is yet another feature of the present invention to provide a nonprivileged instruction to control to enabling and disabling of program interruption by the current processor mode program.

SUMMARY OF THE INVENTION

The aforementioned and other objects are accomplished, according to the present invention, by providing the data processing unit with two registers, an Asynchronous Trap Enable Register (ASTEN) and an Asynchronous Trap Summary Register (ASTSR), which control the program interrupt sequence. The ASTEN register contains bits that control whether the asynchronous program interrupts are enabled for the types of execution modes, e.g., the privileges instruction or kernel mode and the nonprivileged instruction or user mode. The ASTSR register contains bits that signify whether an asynchronous interrupt is pending for the associated execution modes. The pending bits in the ASTSR register are entered by the control program and the particular register bit related to the mode in which the interrupt is generated is cleared when the interrupt is executed. The ASTEN and ASTSR registers are monitored along with the current processor mode and the current processor interrupt priority level to determine when an interrupt can be generated. A nonprivileged instruction is provided to control the enable modes of the ASTEN register.

These and other features of the present invention will be understood upon reading of the following description along with the drawings.

BRIEF DESCRIPTION OF THE DRAWINGS

FIG. 6A is a flow diagram illustrating how an interrupt is generated in response to activity of the program; while

DESCRIPTION OF THE PREFERRED EMBODIMENT

Detailed Description of the Figures

Figure 1A:
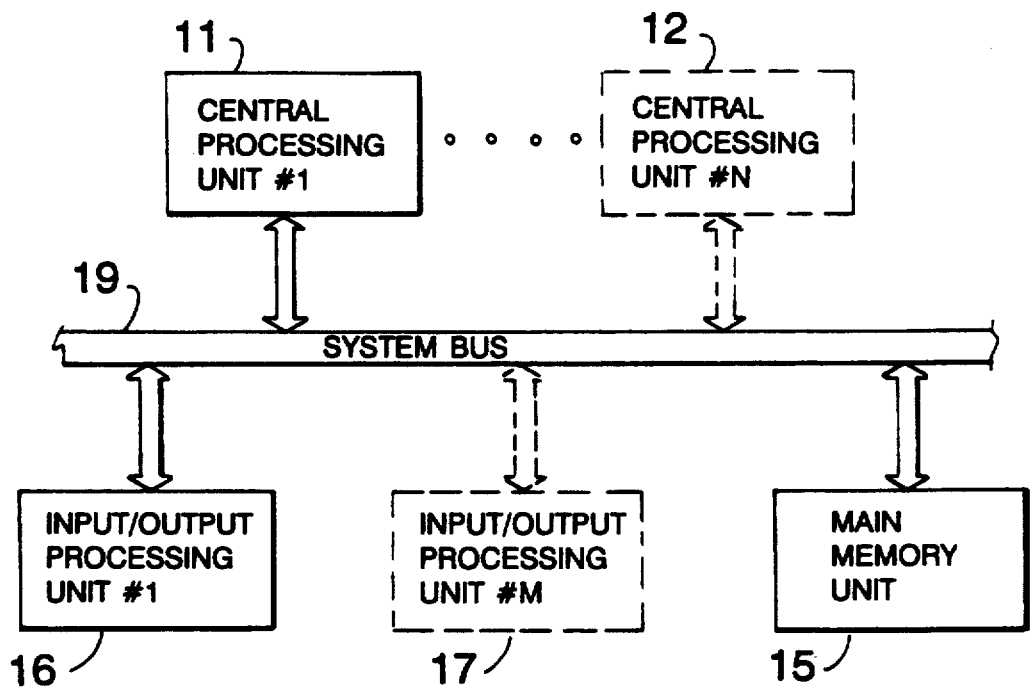
FIG. 1A and FIG. 1B are examples of data processing system implementations capable of using the present invention.
Figure 1B:
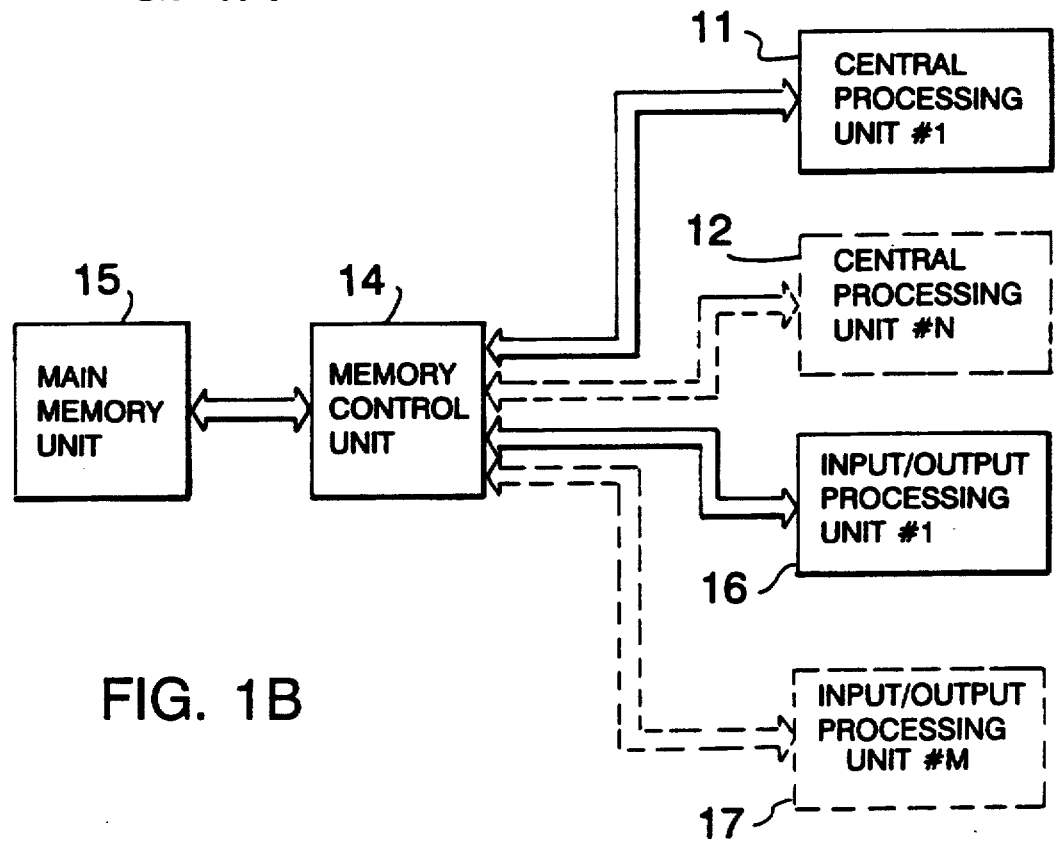

Referring now to FIG. 1A and FIG. 1B, two exemplary data processing system configurations capable of using the present invention are shown. In FIG. 1A, the central processing unit (#1) 11 is coupled to a system bus 19. Other central processing units (e.g., #N) 12 can also be coupled to the system. The central processing unit(s) 11 (through 12) process data according to the structure of the central processing unit(s) in conjunction with central processing unit control programs, the control programs being comprised of instructions resident in the main memory unit 15. The nonresident data an instructions are typically stored in the mass storage unit(s) and are transferred to and from the main memory unit 15 via the system bus 19. Input/output unit(s) {#1} 16 (through {#M} 17) couple devices such as mass memory storage units, user terminal devices and communication devices to the data processing system by means of the system bus 19. The mass storage units store the data and instructions required by the data processing unit(s). Sets of data and/or instructions, typically designated as pages of data and/or instructions, required for the operation of the central processing units 11 through 12, are transferred from the mass storage units, having relatively slow accessibility, to the main memory unit to which access by the central processing unit is relatively fast. The bus oriented system has an advantage in the relative ease to reconfigure the system but has the disadvantage that the each system component requires control apparatus to provide an interface with the system bus. Referring next to FIG. 1B, a data processing system is shown in which the central processing unit(s) 11 (through 12) and the input/output unit(s) 16 (through 17) are coupled to the main memory unit 15 through a memory control unit 14, the memory control unit 14 replacing the system bus 19 and the control function performed by individual data processing system components in the bus oriented data processing configuration shown in FIG. 1A. The memory control unit 14 provides a centralized control and monitoring of the transfer of data and instructions that can be more efficient than the bus oriented configuration of FIG. 1, but with the loss of flexibility.

Figure 2:
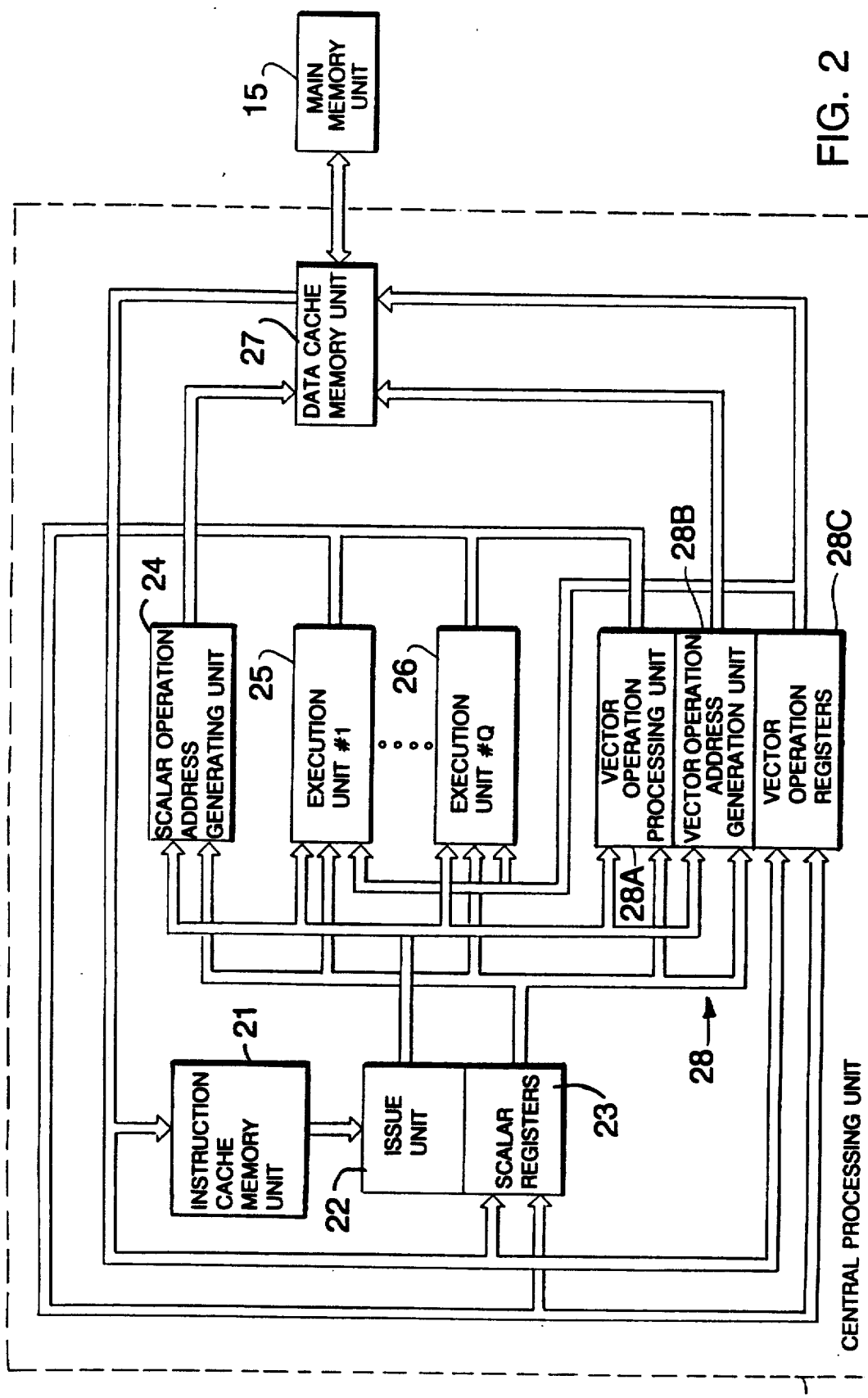
FIG. 2 is an example of a central processing unit of a data processing unit capable of using the present invention.

Referring next to FIG. 2, a block diagram of an exemplary central processing unit capable of effective utilization of the present invention is illustrated. The issue unit 22 is responsible for providing (decoded) instructions to the plurality of specialized execution units comprising scalar operation address generation unit 24, at least one execution unit (#1) 25 (through execution unit {#Q} 26) and a vector operation unit 28, the vector operation unit 28 including vector operation processing unit 28A, vector operation address generation unit 28B and vector operation registers 28C. The data processed by the execution units are typically extracted from the scalar registers 23 or the vector registers 28C. The resulting data from the execution units are stored in the scalar registers 23, in the vector registers 28C or in the data cache memory unit 27. The data cache memory unit 27 can be viewed as a cache memory unit providing an interface between the main memory unit 15 and the central processing unit 11. (The data cache memory unit 27 is shown as being coupled directly to the main memory unit in FIG. 2. As illustrated in FIG. 1A and FIG. 1B, the actual coupling can include intervening data processing apparatus). The issue unit 22 includes apparatus for determining which execution unit will process selected data and for determining when the selected execution unit is available for processing data. This latter feature includes ascertaining that the destination storage location will be available to store the processed data. The instruction cache memory unit 21 stores the instructions that are decoded and forwarded to the appropriate execution unit by the issue unit. The issue unit 22 has the apparatus to attempt to maximize the processing operations of the execution units. Thus, the issue unit 22 includes prefetch apparatus and algorithms to ensure that the appropriate instruction (including any branch instruction) is available to the issue unit 22 as needed. The plurality of execution units are, as indicated by the scalar operation address generation unit 24 and the vector operation unit 28, specialized processing devices for handling certain classes of processing operation. For example, an execution unit can be configured to handle floating point operations, or integer arithmetic operations, etc. The issue unit 22 has associated therewith scalar registers 23 that can store data required for the execution of the program or for providing a record of the data processing operation. For example, one register is the Program Counter register that stores the (virtual) address of the next instruction, in the executing program instruction sequence, to be processed. The scalar operation address generation unit 24 is used to convert virtual addresses to physical locations in the main memory unit 15. The issue unit 22 is also responsible for reordering the data from the execution units in the correct sequence when the execution units process instructions at different rates.

Figure 3:
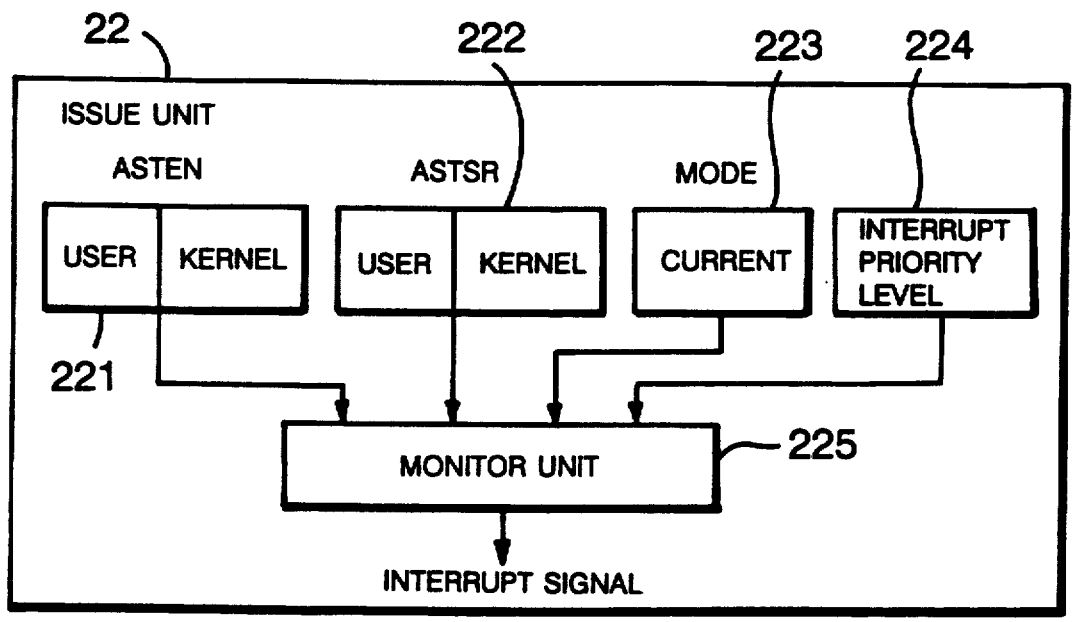
FIG. 3 is block diagram of the apparatus implementing the present invention.

Referring to FIG. 3, the apparatus controlling the generation of an AST interrupt signal is illustrated. An ASTEN register 221 provides a bit position for each system operating mode that indicates if the generation of an AST interrupt signal is enabled for the respective modes. Portions of a program can be of such a nature that the interruption of the executing program may not be appropriate. In order to extend the usefulness of the ASTEN register 221, the instruction set includes a non-privileged instruction, the SWASTEN instruction, that permits the currently executing program to change the enable in the mode position corresponding to the mode of the currently executing program. The ASTSR register 222 also includes a bit position for each system operating mode, however a logic '1' bit stored in either bit position indicates that an AST interrupt condition is pending for the corresponding mode. A storage unit 223 includes a signal indicating the mode of the presently executing program. An interrupt priority level register 224 contains the current interrupt priority level of the data processing system. In the preferred embodiment, the interrupts are processed in a preemptive priority order. In order for an interrupting source to cause an interrupt to be initiated, the priority of the interrupting source must be greater than the current processor interrupt level. When an interrupt is initiated, the previous Program Counter and Program State are stored on the kernel stack memory. The new Program Counter is selected from the system control block in the operating system and is dependent on the interrupting source. The new IPL is set to the IPL of the interrupting source. Thus, interrupts for higher source IPL's can interrupt lower central processing unit IPL's, but not equal or higher IPL's. AST interrupts are initiated at level #1 and can therefore only interrupt program having an IPL #0. The signals stored in these register, 221, 222, 223 and 224 are monitored by monitor unit 225. When signals in the ASTEN register 221, the ASTSR register 222 and the MODE register 223 have signals designating the same mode and the current processor IPL (Interrupt Priority Level) is #0, then the monitor unit generates an interrupt AST signal and an AST interrupt response sequence is initiated.

Figure 4:
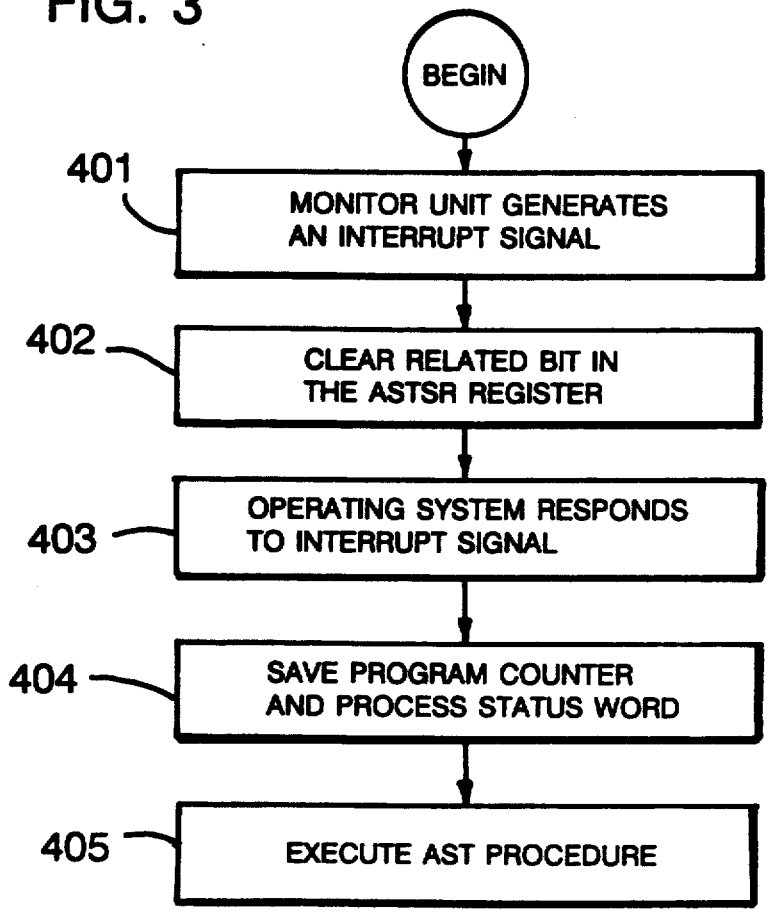
FIG. 4 is flow diagram illustrating the processing unit response to an interrupt signal generated by the present invention.

Referring to FIG. 4, the response of the data processing unit to an AST interrupt signal generated by the monitor unit 225 of FIG. 3 is illustrated. In step 401, the monitor unit generates an AST interrupt signal in response to appropriate input signals. In step 402, the related bit in the ASTSR register is cleared. In step 403, the operating system responds to the generation of an interrupt signal. This response typically takes the form of initiation of a procedure responsive to the interrupt signal. In step 404, the contents of the program counter and the processor status word for the executing program are saved on the kernel stack. The saved register contents permits the data processing unit, after responding to the AST interrupt signal, to resume program execution at the point where the interrupt occurred. The program for responding to the AST interrupt signal has the appropriate parameters (i.e., the context) entered in the data processing unit, and an instruction sequence responsive to the condition signaling an interrupt is executed.

Figure 5:
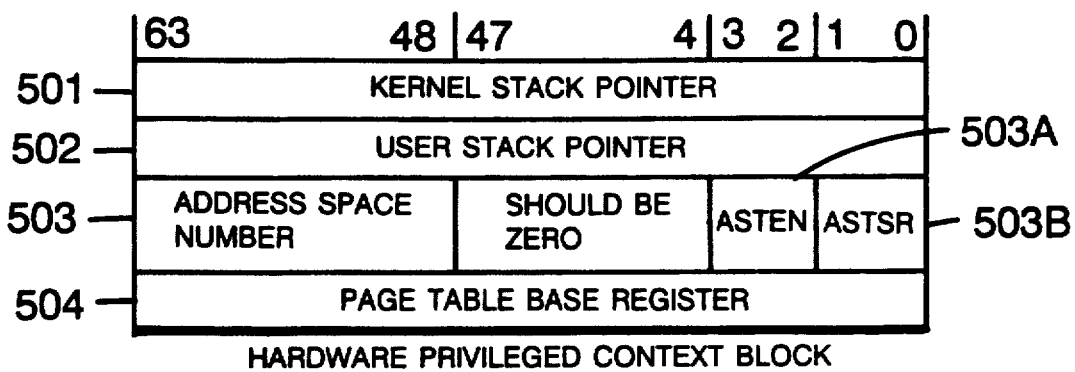
FIG. 5 is the hardware privileged context block according to the preferred embodiment of the present invention.

Referring next to FIG. 5, the format of the hardware privileges context block is shown. The hardware privileged context block is the information saved (by a privileged instruction) when execution of the associated program is suspended. From the perspective of the present invention, the contents of the ASTEN and ASTSR registers, dependent on the associated program, must be saved to permit the return of the data processing unit to executing the associated program. The hardware privileged context block includes a kernel stack pointer field 501, a user stack pointer field 502, a field 503 that includes the address space number and the ASTEN field 503A and the ASTSR field 503B. The contents of the page table base register is stored in field 504.

Figure 6A:
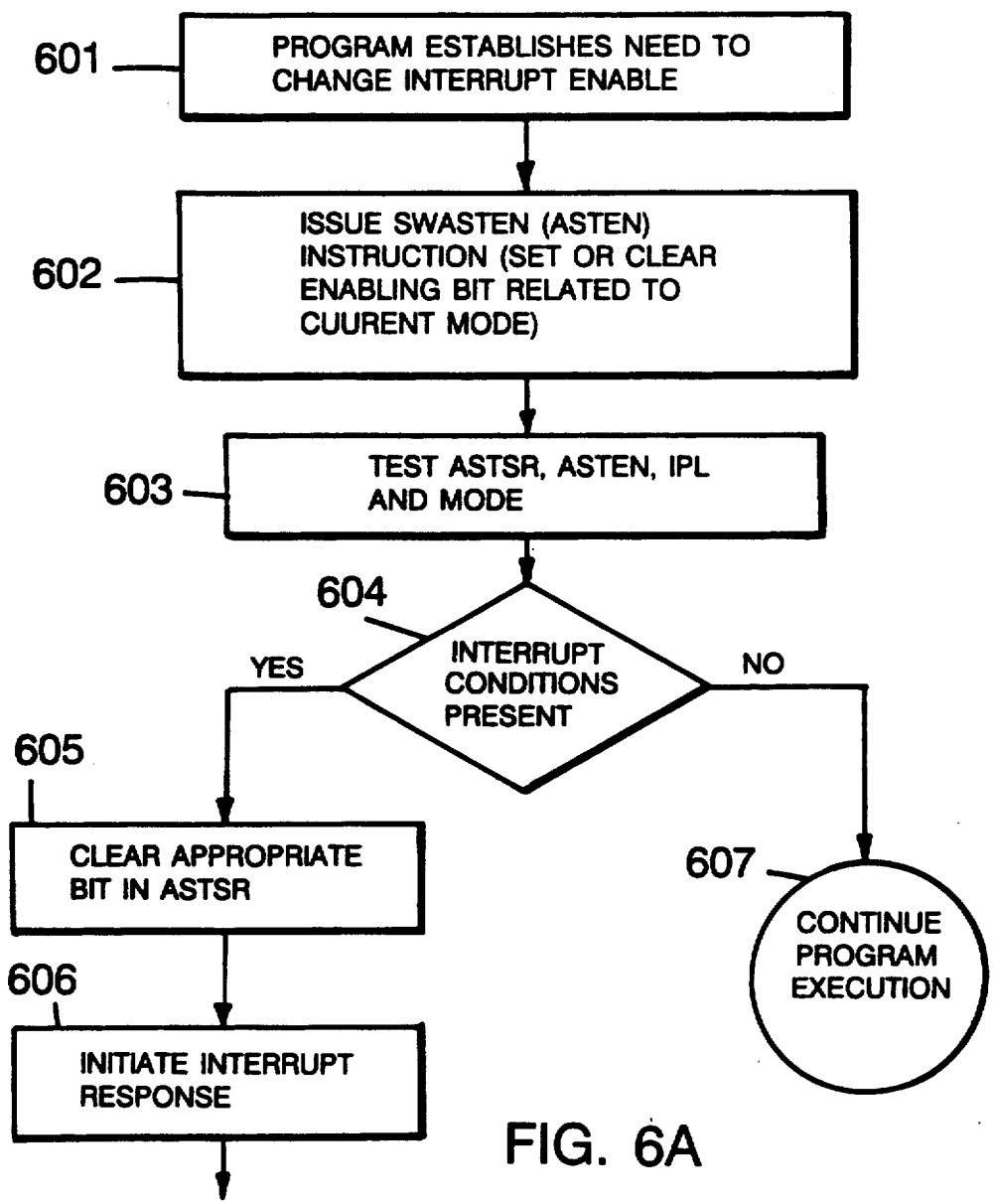

Referring to FIG. 6A, the method by which a program enables the delivery of pending AST interrupts is illustrated. In step 601, the program determines that the conditions for an interrupt are to be enabled. To implement that change, a SWASTEN (Swap ASTEN field) instruction is issued in step 602. The SWASTEN instruction causes an enabling bit related to the current mode to be set in the ASTEN field. As a result of that instruction, the ASTR, the ASTEN, the IPL (Interrupt Priority Level) and the current (operating) mode fields are tested to determine if the conditions are present to execute an interrupt procedure in step 603. When the test indicates that the AST interrupt conditions are present, then the appropriate bit in the ASTSR field is cleared in step 605, and an AST interrupt response is executed in step 606. When the test indicates that the conditions are not present, then the program execution continues. A program can also disable delivery of AST interrupts in the future by using the SWASTEN instruction to disable AST interrupts by clearing the enabling bit in the ASTEN register.

Figure 6B:
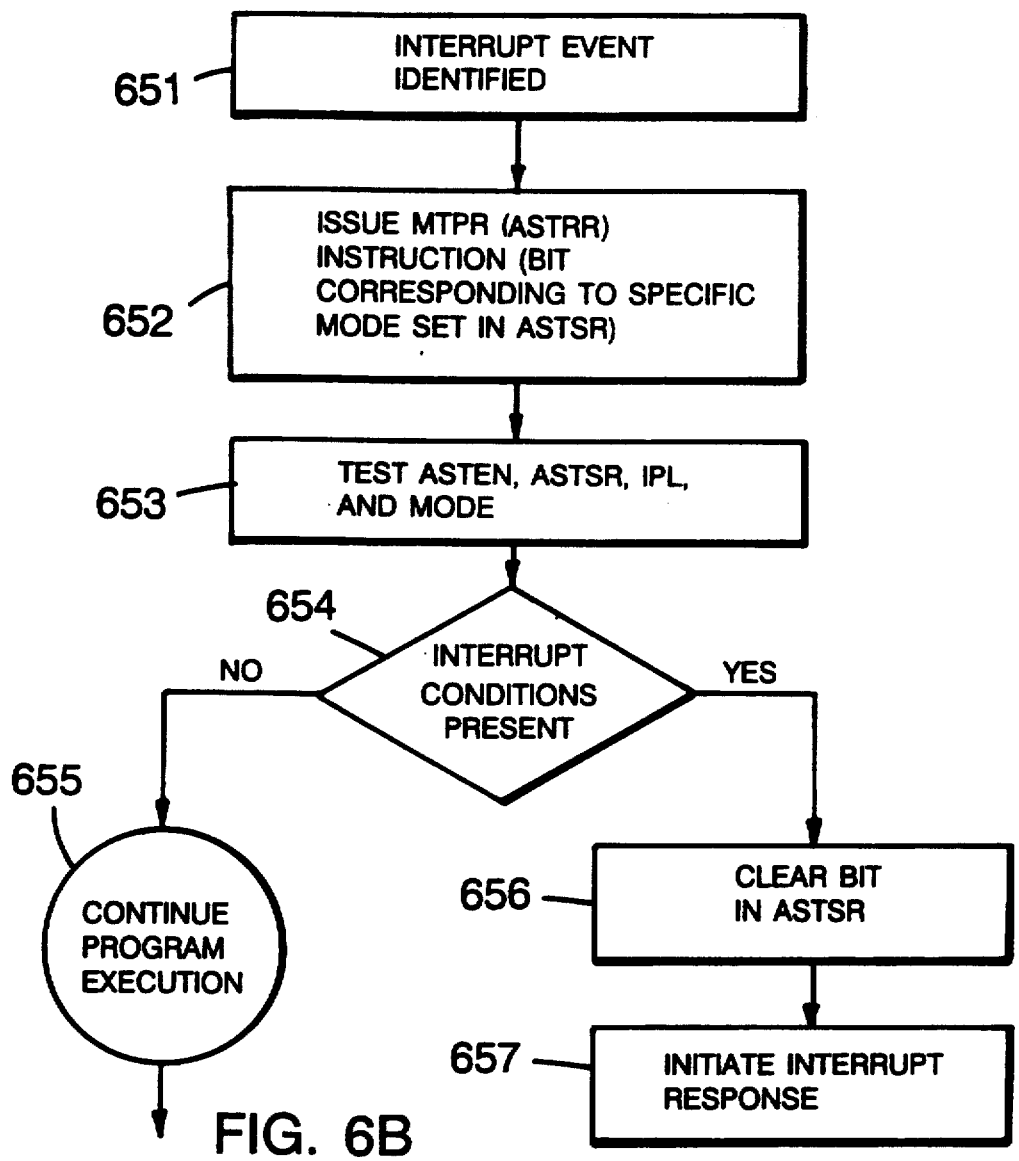
FIG. 6B illustrates how an interrupt is generated in response to activity identifying an interrupt condition according to the present invention.

Referring to FIG. 6B, the generation of an AST interrupt event according to the present invention is shown. As a result of the identification of an interrupt condition in step 651, an MTPR (move to processor register) instruction is issued with the ASTRR (AST request register) register as the destination of the instruction in step 652. The MTPR ASTRR instruction also causes a bit corresponding to a specific operating mode to be set in the ASTSR register. In response to the MRPR ASTRR instruction, the ASTEN, the ASTSR, the IPL and the current mode fields are tested in step 653. When the AST interrupt conditions for the data processing unit are present in step 653, then the bit in the corresponding mode position in the ASTSR field is cleared in step 656 and the responsive interrupt program is initiated in step 657. When the conditions are not present, then the currently executing program continues execution in step 655.

Figure 7:
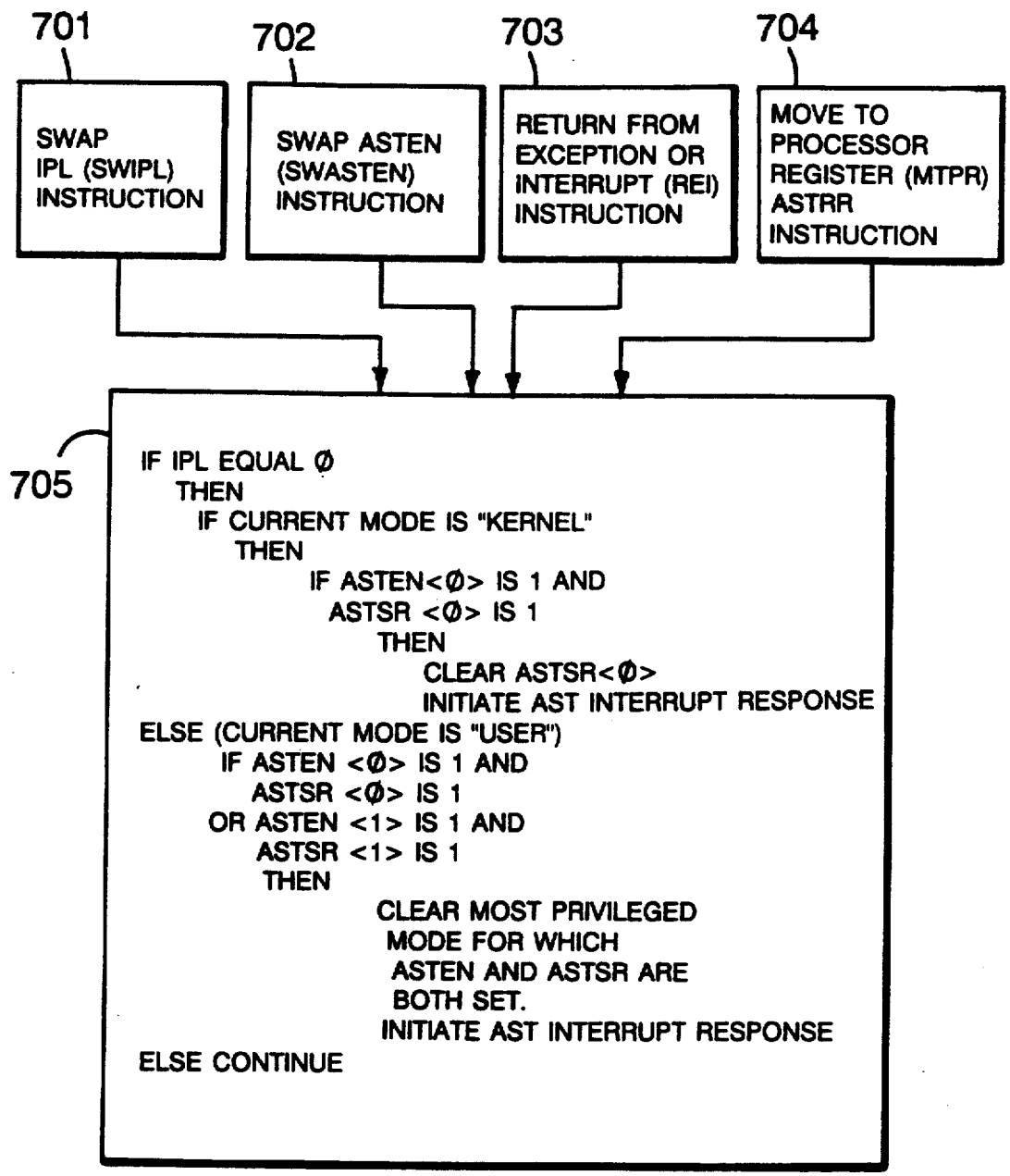
FIG. 7 indicates the instructions resulting in examination of the ASTEN and ASTSR registers and illustrates the test procedure.

Referring next to FIG. 7, instructions using the test in steps 603 and 604 in FIG. 6A and in steps 653 and 654 in FIG. 6B as well as details of the test are shown according to the preferred embodiment. The test involving the ASTEN and ASTSR fields are executed for the SWIPL (Swap Interrupt Priority Level) instruction 701, the SWASTEN (Swap ASTEN) instruction 702, the REI (Return from Exception or Interrupt) instruction 703 and the MTPR (Move To Processor Register) ASTRR instruction. It will be clear that each of these instructions can result in the enabling of an AST interrupt procedure and therefore this condition must be tested. The test logic structure is illustrated in 705. The determination of the IPL value for the currently executing program is examined. Because the IPL value of the AST interrupt program is 1, then the IPL of the currently operating program must be 0 in order for the AST interrupt procedure to be executed. When the IPL of the currently executing program is 0, the determination is made whether the currently executing program is executing in the user mode or in the kernel mode. When the currently executing program is executing in the user mode, if the ASTEN and ASTSR kernel mode fields have a logic '1' bit stored therein, or if the ASTEN and ASTSR user mode fields have a logic '1' stored therein, then the appropriate mode field logic '1' bit in the ASTSR field is cleared and the appropriate (kernel mode has higher priority, then user mode) AST interrupt response is initiated. When the ASTEN and ASTSR fields do not have the appropriate values, then the currently executing procedure is continued. When the currently executing program is executing in the kernel mode, then the ASTEN and ASTSR fields for the kernel mode is checked and, when two logic '1's bits are identified, the kernel mode AST interrupt response is initiated. When the two kernel mode signals are not present, then execution of the currently executing program is continued.

Figure 8:
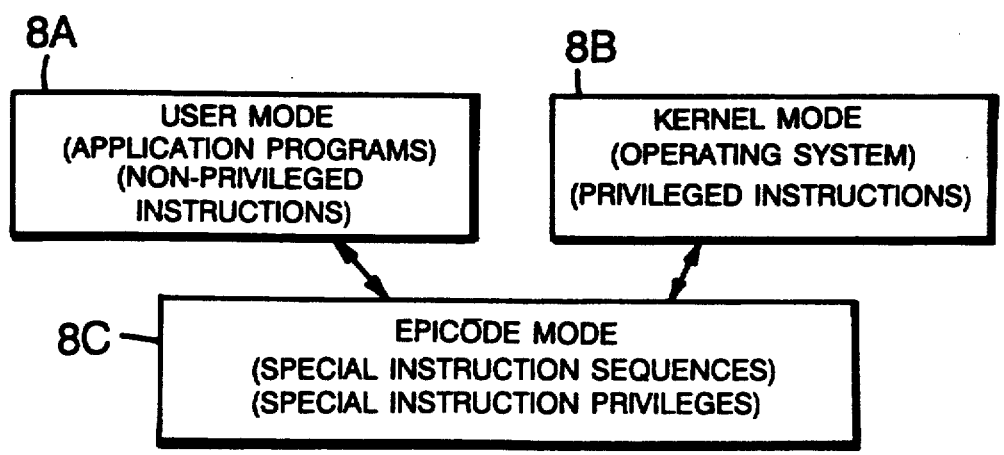
FIG. 8 is a diagrammatic illustration of the relationship of the data processing system operating system modes.

Referring next to FIG. 8, the relationship of the two typical operating system modes and the EPICODE mode is shown. The user mode 8A typically executes application type program that perform processing functions of immediate interest to the user. The user is provided with relatively complete control in order to obtain the desired processing capabilities. The instructions are typically nonprivileged in the sense that the order and selected aspects of the instruction are under control of the user. The kernel mode 8B is the mode in which the operating system executes instructions. The kernel mode executes all instructions available in the user mode as well as additional instructions associated with the kernel mode 8B that are privileged and therefore are not available to manipulation by a user. Privileged instructions are not allowed in user mode because they could compromise the security of other users or programs. This mode of data processing system operation is reserved for instruction sequences that should execute without interruption and/or should not execute unless the data processing system is in a predetermined state. Some instructions that can be executed in user mode 8A or in kernel mode 8B require a transition into the EPICODE mode 8C. This mode is provided with certain privileges and certain dedicated hardware implementing the strategy to ensure noninterruptable (atomic) execution of the instruction sequence.

Operation of the Preferred Embodiment

The central processing unit having pipelined execution units of FIG. 2 was implemented in the preferred embodiment subject to several constraints, however, other design implementations can utilize the present invention. The central processing unit includes a plurality of execution units, each execution unit adapted to execute a class of instructions. By way of example, one execution unit, the scalar address generating unit 24, controls the transfer of the logic signal groups between the central processing unit and the main memory unit, i.e., executes the scalar load/store instructions. One execution unit is adapted to execute data shifting operations, one execution unit for floating point add/subtract operations, one execution unit is adapted for integer and floating point multiply operations and one execution unit is adapted for integer and floating point divide operations. The specialized execution units can be, but are not necessarily implemented in a pipelined configuration. The other features of the central processing unit are the following. The instruction in the currently executing sequence of instructions is transferred to the issue unit 22 from the instruction cache memory unit 21. In the issue unit, the instruction is broken down into its constituent parts and data-dependent control signals and address signals are generated therefrom. However, before an instruction can begin execution (i.e., be issued), several constraints must be satisfied. All source and destination registers for the instruction must be available, i.e., no write operations to a needed register can be outstanding. The register write path must be available at the future cycle in which this instruction will store the processed quantity. The execution unit to be required for processing the instruction during the execution must be available to perform the operation. With respect to the vector operation unit, a vector operation reserves an execution unit for the duration of the vector operation. When a memory load/store instruction experiences a cache memory unit miss, the load/store unit busy flag will cause the subsequent load/store instructions to be delayed until the cache memory miss response is complete. When an instruction does issue, the destination register and the write path cycle for the result are reserved. During operand set-up, all instruction-independent register addresses are generated, operands are read and stored, and data-independent control signals are generated. The instruction operands and control signals are passed to the associated execution unit for execution. The result generated by the execution unit is stored in the register files or in the data cache memory unit 27 as appropriate. Once an instruction issues, the result of the processing may not be available for several machine cycles. Meanwhile, in the next machine cycle, the next instruction can be decoded and can be issued when the requisite issue conditions are satisfied. Thus, the instructions are decoded and issued in the normal instruction sequence, but the results can be stored in a different order because of the varying instruction execution times of the execution units. This out of order storing complicates the exception handling and the retry of failing instructions. However, these events are relatively rare, and the out of order storing provides execution and hardware advantages.

The AST (Asynchronous System Trap) events of the preferred embodiment are on a per program basis. These events are initiated by software programs. Each program (or process) has a set of values that are entered in the ASTEN and ASTSR fields while the program is in execution. The contents of these fields determine when the currently executing program is interrupted to execute a privileged control program procedure in the context environment of the program or a nonprivileged program procedure in the context environment of the program. The state of the ASTEN field is controlled by the program, and the enable state for the executing program in the current mode can be changed by the SWASTEN instruction. The state of the ASTSR field is controlled by a control program. When an event occurs that requires interruption of the currently executing program, the control program writes the mode in which the corresponding interrupt procedure will execute to the ASTRR register. Writing to the ASTRR register causes a bit to be entered in the ASTSR field corresponding to the mode associated with the ASTRR register. The ASTEN and ASTSR fields are part of a program's context environment. These fields are saved and restored when context switching between programs is performed.

The processing unit constantly monitors the state of the ASTEN and ASTSR registers, the current operating mode of the processor, and the current processor interrupt priority level. When the current processor interrupt priority level is zero and the bits corresponding to the current or more privileged processor mode in the ASTSR register and in the ASTEN register are set, then an AST interrupt response is initiated. These conditions are tested in response to certain instructions. The hardware responds to this interrupt by saving the contents of the program counter and the processor status word and then suspends the currently executing program. The saving of the register contents permits the data processing unit to continue execution of the suspended program when the AST interrupt procedure is completed.

The nonprivileged or user mode instruction (SWASTEN) is provided so that the state of the enable mode from which the instruction is executed can be changed in the ASTEN register. In this manner, the owner of a process can determine its interruptability.

The current invention provides a mechanism for control of the interrupt process on a per program basis. The current mechanism is not tied to a software interrupt procedure and never generates an interrupt in the absence of a detected interrupt condition. The interrupt execution can occur without the necessity for the control program to poll related event conditions or to have the executing program notify the control program when interruption is not acceptable.

In the preferred embodiment, the SWASTEN and the MTPR instructions are executed in the EPICODE mode. In this processing environment, multistep instructions can be executed as a unit (typically interrupts are disabled) and can even be stored in a dedicated portion of memory to eliminate the paging operation. In this manner, the test of the various fields can be performed efficiently. It will be clear that an interrupt response will be generated in response to a change in the processing environment, i.e., either a change in the interrupt enable conditions for the current operating mode or identification of an interrupt event. The ASTEN and ASTSR registers have been described as physical register. However, it will be clear that these registers can be implemented as fields in a data block.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. An apparatus for responding to interrupt conditions that occur in a data processing system having a kernel mode of operation for executing privileged and nonprivilege instructions of a currently executing program and a user mode of operation for executing nonprivileged instructions of said currently executing program, comprising:

first register means having a first storage element corresponding to said user mode of operation and a second storage element corresponding to kernel mode of operation;

means, responsive to execution of an instruction in the currently executing program, for generating an enabling signal corresponding to one of said modes of operation and indicating that said mode of operation is enabled to be interrupted in response to one or said interrupt conditions, and for storing said enabling signal in the storage element of said first register means that corresponds to the mode to which said enabling signal corresponds;

second register means having a first storage element corresponding to said user mode of operation and a second storage element corresponding to said kernel mode of operation;

means, responsive to execution of a control program, for generating an interrupt condition present signal that corresponds to one of said modes of operation and indicates that one of said interrupt conditions has occurred in said mode of operation, and for storing said interrupt condition present signal in the storage element of said second register means that corresponds to the mode to which said condition present signal corresponds;

means, responsive to said currently executing program, for generating a signal designating a mode of operation of said currently executing program;

third register means for storing said signal designating said mode of operation; and monitor means connected to said first, second, and third register means, for generating an interrupt signal when said first, second, and third register means have signals stored therein corresponding to the same mode of operation.

2. The apparatus of claim 1 wherein said means for generating and storing said enabling signal comprises said currently executing program.

3. The apparatus of claim 2 wherein said currently executing program executes a nonprivileged instruction to generate and store said enabling signal.

4. The apparatus of claim 1 further comprising a fourth register means for storing an indication of an interrupt priority level, said indication being stored in said fourth register means by said data processing system, said monitor means being further responsive to said indication stored in said fourth register means, said interrupt signal being generated only when said indication has a preselected value and said first, second and third register means have signals stored therein corresponding to the same mode of operation.

5. The apparatus of claim 4 wherein instructions from said data processing system enable said monitor means, and said instructions from said data processing system include an instruction for changing said indication of said interrupt priority level, an instruction that causes said enabling signals to be stored in and removed from said first register means, an instruction that causes said interrupt condition present signals to be stored in and removed from said second register means, and an instruction for returning to data processing system operation after execution of an exception or interrupt subroutine.

6. The apparatus of claim 5 wherein, after said monitor means generates said interrupt signal, said data processing system removes said interrupt condition present signal stored in said either storage element of said second register means.

7. The apparatus of claim 6 wherein said data processing system includes a third mode of operation, said instructions that enable said monitor means being executed in said third mode of operation.

8. The apparatus of claim 4 wherein said preselected value of said indication of said interrupt priority level corresponds to a lowest value of said interrupt priority level.

9. The apparatus of claim 1 wherein said interrupt signal causes a response to said one of said interrupt conditions only if said interrupt condition relates to a mode of operation at least as privileged as said mode of operation of said currently executing program.

10. The apparatus of claim 9 wherein said interrupt signal causes said data processing system to remove said interrupt condition present signal from the storage element of said second register means that corresponds to the mode to which said condition present signal corresponds.

11. The apparatus of claim 1 wherein said enabling signal stored in said first register means and said interrupt condition present signal stored in said second register means comprise a portion of a stored program context.

12. The apparatus of claim 1 wherein said currently executing program executes instructions to cause changes in conditions of said signals in said first and said second register means, said monitor means responding to said changes by determining if said first, second, and third register means have said signals stored therein corresponding to the same mode of operation.

13. The apparatus of claim 1 wherein said currently executing program executes instructions to cause said monitor means to generate said interrupt signal when said second storage element of said first register means contains an enabling signal that corresponds to said kernel mode and said second storage element of said second register means contains an interrupt condition present signal that corresponds to said kernel mode when said data processing system is in said kernel mode of operation.

14. The apparatus of claim 13 wherein said instructions from said data processing system cause said monitor means to generate said interrupt signal when said data processing system is in said user mode of operation and when said enabling signal and said interrupt condition present signal are respectively stored in said first storage elements of said first and said second register means, said instructions from said data processing system causing said monitor means to generate said interrupt signal during said kernel mode of operation when said enabling signal and said interrupt condition present signal are respectively stored in said second storage elements of said first and said second register means.

15. The apparatus of claim 1 wherein instructions of said currently executing program enable said monitor means to determine if said first, second, and third register means have signals stored therein corresponding to the same mode of operation.

16. The apparatus of claim 1 wherein execution of a user program can cause said data processing system to store said enabling signals in and remove said enabling signals from said first storage element of said first register means.

17. A method of responding to asynchronous interrupt conditions that occur in a data processing system having a plurality of modes of operation, comprising the steps of:
in response to execution of an instruction in a currently executing program, storing in a first register means an enabling signal corresponding to one of said modes of operation and indicating that said data processing system can respond to an asynchronous interrupt condition in said corresponding mode;
detecting with a control program an occurrence of one of said asynchronous interrupt conditions;
causing said control program to respond to the detection of said occurrence of said one of said asynchronous interrupt conditions by storing in a second register means an interrupt condition present signal corresponding to one of said modes of operation and indicating said occurrence of said one of said asynchronous interrupt conditions in said corresponding mode;
monitoring said enabling signal and said interrupt condition present signal and determining whether said enabling signal and said interrupt condition present signal correspond to the same mode as the mode in which the data processing system is operating while executing said currently executing program; and
issuing an interrupt signal when said enabling signal and said interrupt condition present signal correspond to the same mode as the mode in which said data processing system is operating while executing said currently executing program.

18. The method for responding to asynchronous interrupt conditions of claim 17 wherein said step of storing said enabling signal in said first register means includes the step of storing one of said enable signals in response to an instruction executing in said mode to which said one enable signal is related.

19. The method for responding to asynchronous interrupt conditions of claim 17 wherein said step of issuing said interrupt signal includes the step of executing one of a plurality of instructions.

20. The method for responding to asynchronous interrupt conditions of claim 17, said data processing system, including a user mode for executing nonprivileged instructions and a kernel mode for executing privileged and nonprivileged instructions, wherein, when said data processing system is operation in said user mode of operation, said issuing step includes the step of issuing said interrupt signal when said enabling signal and said interrupt condition present signal are present for said user mode of operation or when said enabling signal and said interrupt condition present signal are present for said kernel mode of operation, and wherein, when said data processing system is operating in said kernel mode of operation, said issuing step further includes the step of issuing said interrupt signal when said enabling signal and said interrupt condition present signal are present for said kernel mode of operation.

21. An apparatus for responding to interrupt conditions that occur in a data processing system having a first and a second mode of operation, comprising:
means, responsive to execution of an instruction in a currently executing program, for generating enabling signals each of which corresponds to one of said modes of operation and enables generation of an interrupt signal for said corresponding mode;
first register means for storing said enabling signals;
means, responsive to execution of a control program, for generating interrupt condition signals each of which corresponds to one of said modes of operation and indicates the presence of an interrupt condition for said corresponding mode;

second register means for storing said interrupt condition signals;

means for identifying which of said first mode or said second mode is a current mode of operation of said data processing system; and interrupt means connected to said first register means and said second register means, for responding to the identification of said current mode of operation and to an occurrence of one of said interrupt conditions by generating an interrupt signal when one of said enabling signals stored in said first register means and one of said interrupt condition signals stored in said second register means correspond to the same mode of operation as said current mode of operation of said data processing system.

22. The apparatus of claim 21 wherein said data processing system is capable of issuing a plurality of instructions having subroutines for determining when said enabling signal and said interrupt condition present signal both relate to said current mode of operation.

* * * * *